United States Patent [19]

Gary et al.

[11] Patent Number: 4,565,957

[45] Date of Patent: Jan. 21, 1986

[54] METHOD AND SYSTEM FOR STARTING A MOTOR-COMMUTATED SCR INVERTER

[75] Inventors: James R. Gary, Elk Grove Village, Ill.; Everett R. Geis, Orange, Calif.; Todd L. King, Buffalo Grove; Daljit Singh, Elk Grove Village, both of Ill.

[73] Assignee: Borg-Warner Corporation, Chicago, Ill.

[21] Appl. No.: 509,625

[22] Filed: Jun. 30, 1983

[51] Int. Cl.$^4$ ............................................. H02P 5/40
[52] U.S. Cl. .................................... 318/723; 318/722
[58] Field of Search ............... 318/696, 138, 254, 721, 318/722, 723, 439

[56] References Cited

U.S. PATENT DOCUMENTS

| | | | |
|---|---|---|---|
| 3,612,973 | 10/1971 | Kuniyoshi | 318/254 |
| 3,696,277 | 10/1972 | Liska et al. | 318/138 |
| 3,786,326 | 1/1974 | Hubner | 318/138 |
| 3,840,799 | 10/1974 | Macko et al. | |
| 3,872,364 | 3/1975 | Hubner | |
| 3,940,669 | 2/1976 | Tsuboi et al. | |
| 4,275,343 | 6/1981 | Fulton et al. | 318/724 |
| 4,431,953 | 2/1984 | Schray et al. | 318/254 |
| 4,443,747 | 4/1984 | Chausse et al. | 318/723 |
| 4,455,513 | 6/1984 | Fulton et al. | 318/721 |

*Primary Examiner*—David Smith, Jr.
*Attorney, Agent, or Firm*—James E. Tracy

[57] ABSTRACT

Highly reliable and consistent starting is achieved by first initializing the rotor position, namely establishing the rotor in a known starting position. This is accomplished by gating on two pairs of SCRs in sequence and supplying current pulses through the gated SCRs to the stator of the motor to rotate the rotor to a first position and then to a second position, the rotor coming to a complete stop in each of those positions. The rotor aligns itself with the magnetic field created by the stator in each position and any ambiguity in the rotor position is eliminated. Thereafter, the inverter is operated asynchronously in a second mode with predetermined pairs of the inverter SCRs being sequentially gated into conduction at an increasing frequency to current pulse energize the motor to effect step-by-step rotation of the rotor at a faster and faster rate, the motor current being reduced to zero at the termination of each energizing pulse to force commutate the conducting pair of SCRs. After the motor has reached a preset speed, operation in a third mode occurs and the inverter is synchronized with the motor, gating of the SCRs being controlled by the motor voltage in order that the rotor position will be synchronized to the revolving magnetic field created by the stator. During this third operating mode the motor speed continues to increase and the SCRs are forced commutated, as a result of which the rotor follows the stator magnetic field very closely and synchronization will be perfected. When the motor subsequently reaches a given speed sufficiently high to permit motor commutation exclusively, the starting system switches to a fourth and normal running mode wherein the gating of the inverter SCRs continues to be synchronized with the motor and controlled by the motor voltage, but the SCRs will now be commutated only by the motor voltage. Operation in the third mode provides a buffer and ensures a very smooth, reliable, consistent and a relatively short transition from asynchronous, forced-commutation operation to synchronous, motor-commutated operation.

1 Claim, 3 Drawing Figures

METHOD AND SYSTEM FOR STARTING A MOTOR-COMMUTATED SCR INVERTER

BACKGROUND OF THE INVENTION

This invention relates to a starting circuit and a starting method for an SCR inverter-motor system, where the SCRs in the inverter are motor commutated during normal running operation.

One form of a variable speed drive consists of a synchronous motor driven by a motor-commutated SCR inverter. The SCRs (silicon controlled rectifiers) in the inverter are gated or turned on in predetermined pairs or sets and in a prescribed sequence in order to convert an applied d-c bus voltage, received over a d-c bus or link from a controlled d-c power supply, to a-c voltage for application to the motor. During normal operation, the frequency of the inverter (namely, the gating of the SCRs) is synchronized with the frequency or speed of the motor, usually with rotor position sensors or by sensing the motor voltage or flux. Before each pair of SCRs are gated into conduction, at least one previously conducting SCR must be commutated or switched off so no current flows therethrough. When the motor is of the synchronous type motor commutation may be employed, the motor terminal voltage being used to commutate the inverter SCRs. This obviates the need for forced commutation circuitry. As is well understood in the art, the inverter-motor system may be constructed and operated to present a leading power factor to the inverter a-c terminals, the alternating current in each of the motor's stator windings thereby always leading the alternating motor voltage across that winding. Basically, it involves providing a motor back EMF (electromotive force) that is greater than the applied inverter voltage. The back EMF is induced in the stator windings by the rotating flux produced by the magnet (either a permanent magnet or an electromagnet) in the rotor. With a leading power factor, when an inverter SCR is gated on it will cause the back EMF to reverse bias and to turn off a previously conducting SCR, the motor current thereby effectively transferring to the on-coming SCR.

The problem presented with a motor-commutated SCR inverter is that the motor must be running in order for the rotating flux from the rotor to cut the stator windings and induce therein a back EMF of adequate magnitude to commutate the SCRs. Starting apparatus of some type must therefore be employed to start the motor rotating and bring it up to a speed at which the required back EMF will develop and take over the commutation of the inverter SCRs. Starting systems have been developed which regulate the d-c power supply and the sequential gating of the inverter SCRs to effectively apply time-separated current pulses to the stator windings to effect step-by-step motor rotation at an increasing or accelerating rate until the back EMF reaches a threshold level at which motor commutating and normal running operation occur. During starting the inverter SCRs may be forced commutated, before a new pair of SCRs are gated on, by reducing the d-c link or bus current to zero. In these prior starting systems, various arrangements are used to synchronize the gating or firing of the inverter SCRs to the motor, namely to the rotor position or back EMF. For example, the desired synchronization may be achieved by a position sensor mounted on the motor shaft. When a position sensor is not used, sophisticated and complex computation circuits may be employed to obtain synchronizing information, for controlling the inverter operation, from the motor terminal voltage. In accordance with another prior starting technique, referred to as the "open loop" method, the inverter frequency is slowly increased up to the motor commutation speed and the system is switched over to motor commutating. If the inverter and motor are properly synchronized, the motor will run normally. On the other hand, if a commutation failure occurs the system is stopped and restarted. This trial and error procedure is repeated until normal motor commutation takes place.

The starting system of the present invention constitutes a significant improvement over these prior starting schemes. Highly reliable, fast and smooth starting is achieved by means of a relatively simple and inexpensive circuit arrangement, requiring no shaft position sensors or sophisticated computation circuits and not employing trial and error techniques.

SUMMARY OF THE INVENTION

The invention provides a starting system for an inverter-motor system wherein a synchronous motor, having a stator and a rotor, is normally driven by the output a-c voltage developed by an inverter, which has a series of motor-commutated SCRs that are gated on in predetermined pairs and in a prescribed sequence, from an applied d-c bus voltage received over a d-c bus from a controlled d-c power supply, such as a phase-controlled SCR rectifier bridge. Just before starting, the rotor position is unknown. In accordance with one aspect of the invention, the rotor position is initialized, namely the rotor is established in a known starting position. This is achieved by providing means for controlling the d-c power supply and for applying gating signals to a first pair of inverter SCRs to supply a bus current pulse through those SCRs to the stator to create a first magnetic stator field having a magnetic axis, defining a first position, to which the rotor rotates and aligns itself. Means are provided for removing the gating signals from the first pair of SCRs and for reducing the bus current to zero to force commutate those SCRs. Means, operative after the rotor has rotated to the first position and has come to a complete stop and after the first pair of SCRs have been forced commutated, are provided for controlling the d-c power supply and for gating on the next pair of inverter SCRs in the prescribed sequence to supply a bus current pulse to the stator to produce a new magnetic stator field whose magnetic axis is rotated relative to the first magnetic axis and defines a second and known position, the rotor turning to and aligning itself with the new axis thereby initializing the rotor position and eliminating any ambiguity. The rotor position is now uniquely determined. Repeating the aligning process avoids ambiguity since the first alignment could place the rotor in either of two positions: aligned with the stator magnetic axis or 180° (electrical) away from it. At the end of the second alignment, the rotor can settle in only one position where it is exactly aligned with the stator magnetic axis. The starting system also comprises means, operative after the rotor has rotated to the second positon and has come to a complete stop, for supplying to the inverter a series of bus current pulses recurring at an increasing frequency and for gating on a new pair of SCRs in the prescribed sequence during each current pulse to effect step-by-step rotation of the rotor, from the second and known position, at a faster and faster rate, the SCRs being forced commutated.

In accordance with another aspect of the invention, a smooth transition into motor commutation is accomplished by providing means, effectively operative after the rotor has been rotated from its second position and has reached a preset speed, for sensing the motor voltage and for developing synchronizing pulses in response to the sensed motor voltage. Means are also included for utilizing each synchronizing pulse to reduce the motor current to zero to force commutate the conducting pair of inverter SCRs and to then gate on the next pair of SCRs in the prescribed sequence and supply current to the motor through that next pair of SCRs, thereby effectively synchronizing the gating of the inverter SCRs to the rotor position while at the same time the SCRs are forced commutated. The SCRs are forced commutated to insure proper commutation in the event that commutation by motor back EMF is not yet sufficient.

In the illustrated embodiment of the invention, the inverter is powered with a voltage source, but it will be readily apparent that the invention could be employed with the conventional current fed inverter.

DESCRIPTION OF THE DRAWINGS

The features of the invention which are believed to be novel are set forth with particularity in the appended claims. The invention may best be understood, however, by reference to the following description in conjunction with the accompanying drawings in which:

DESCRIPTION OF THE ILLUSTRATED EMBODIMENT

Figure 1:
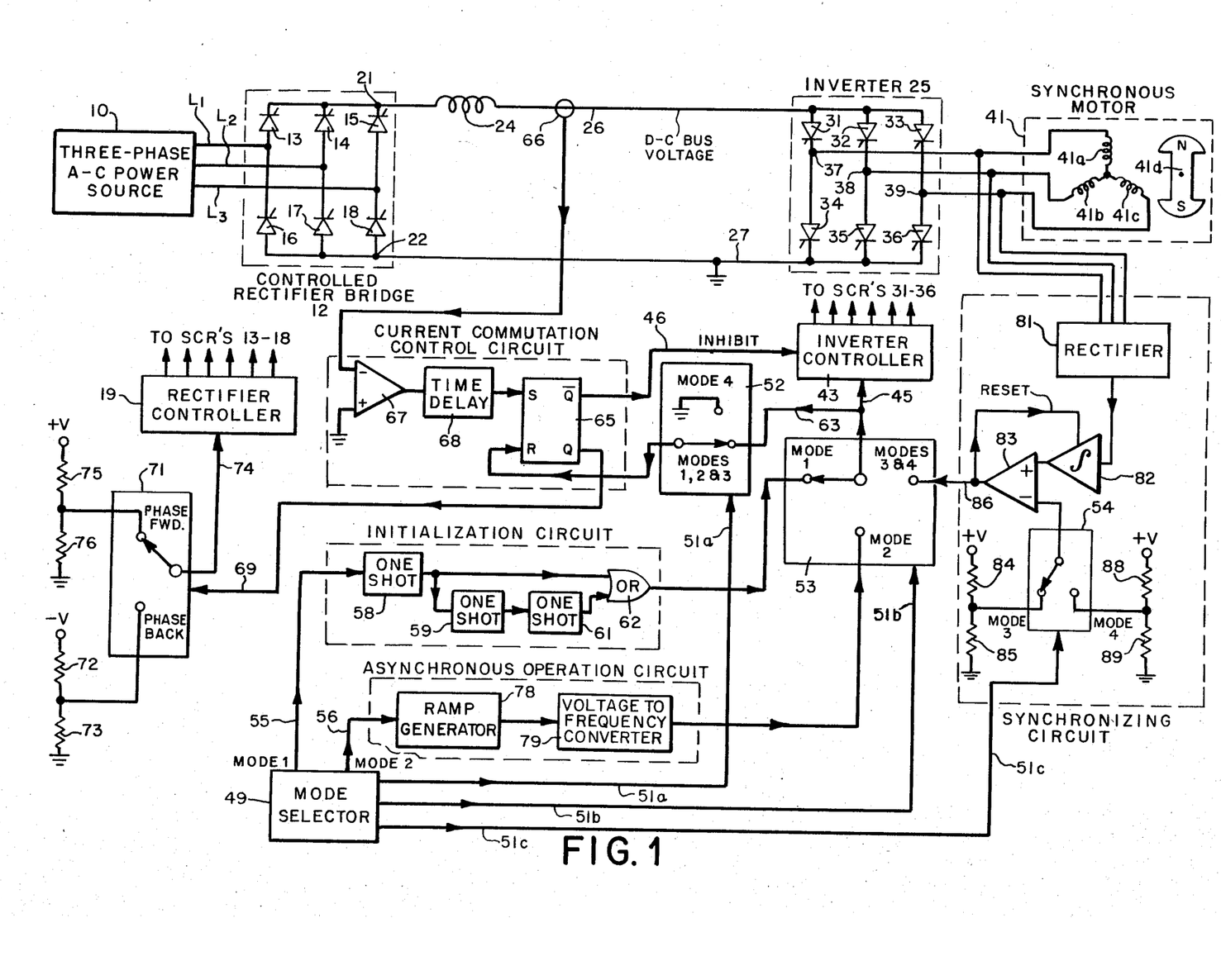
FIG. 1 schematically illustrates a starting system, constructed in accordance with the invention, and the manner in which that starting system is incorporated in a motorcommutated SCR inverter to effect starting thereof.

Referring to FIG. 1, line conductors $L_1$, $L_2$ and $L_3$ connect to a conventional three-phase A-C power source 10 which may be the usual A-C power mains, and thus provide three-phase a-c voltage, namely three alternating voltages varying in sinusoidal fashion and having the same amplitude and frequency but being phase-displaced with respect to each other by 120°. The frequency of the a-c power line voltages will usually be either 50 or 60 cycles per second or hertz, and the magnitude of those voltages may take any appropriate value depending on the characteristics of the load to be energized or driven. As will be made apparent, power source 10 need not be three-phase. It can be any multiphase a-c power supply, or even a single phase source.

The a-c energy received over the line conductors from source 10 is converted to d-c power by an a-c to d-c converter 12, which in the illustrated embodiment takes the form of a conventional phase-controlled SCR rectifier bridge. Specifically, controlled rectifier bridge 12 has a family of six SCRs 13–18 arranged in three pairs, to each of which pairs is applied a respective one of the three alternating phase or line voltages provided by three-phase A-C power source 10. In well-known manner, the firing angles of the six SCRs are controlled, by gating signals from rectifier controller 19, in order to establish at the bridge's output terminals (designated 21 and 22) a rectified voltage of a desired magnitude and in order to control the power supplied from source 10 and through bridge 12 to the inverter-motor arrangement. Each SCR in bridge 12 can conduct, during each half cycle of the voltage applied thereto from source 10, when the SCR's anode is positive relative to its cathode. However, conduction will not occur during a half cycle until gate current is supplied to the SCR's gate from rectifier controller 19. At that instant, the SCR fires into conduction and permits current to flow therethrough. As is well understood in the art, the sooner the SCR is fired into conduction at the beginning of a positive half cycle (namely the smaller the firing angle), the greater will be the average rectified voltage across terminals 21 and 22, and that voltage will be of positive polarity at terminal 21 with respect to terminal 22. This is known as the "phase forward" condition, the d-c load current flowing out of terminal 21 and back into terminal 22. If the firing angle is now increased to 90°, the average output voltage across terminals 21 and 22 will be zero. By increasing the firing angle above 90°, each SCR is not turned on until the latter half of the positive half cycle applied thereto and this causes bridge 12 to produce a negative output voltage at terminal 21 relative to terminal 22. The current from bridge 12 will not change directions (continuing to flow out of terminal 21 and into terminal 22), but the output voltage will reverse. This is called the "phase back" condition. The term relates to phasing the firing angle back so that it is closer to the completion of the half cycle. Thus, when the firing angle is close to 0° a maximum positive voltage will be developed at terminal 21, whereas with a firing angle close to 180° a maximum negative voltage appears at terminal 21 relative to terminal 22.

Series-connected inductor 24 filters or smooths the rectified voltage from bridge 12 to develop a filtered d-c voltage for application to SCR inverter 25 over the d-c bus or link provided by lines 26 and 27. Of course, during normal running operation of the inverter-motor system bridge 12 is controlled by rectifier controller 19 so that it is phased forward, a positive-polarity d-c bus voltage therefore appearing on line 26 with respect to line 27 which is connected to a ground plane of reference potential or circuit common, zero volts in the illustrated embodiment. The inductance of inductor 24 need not be very large. Relatively little filtering or smoothing is actually required. A primary function of inductance 24, however, is to restrict the bus current in the event of either a short circuit in the motor or an unwanted lock-on of the SCRs in the inverter, namely when a wrong pair of SCRs are on at the same time, fault conditions that would cause a short circuit to exist across the d-c bus 26, 27. Without the protection afforded by inductance 24, the motor and/or the SCRs could be damaged or destroyed. If either of those fault conditions occur, inductance 24 absorbs the entire bus voltage and limits the rate of rise of current until the controlled rectifier bridge 12 can be shut off. Circuitry (not shown) may be provided to sense the bus current and to turn the bridge completely off when that current becomes excessive.

It is to be noted that no shunt-connected filter capacitor is employed with the series-connected filter inductor 24. Such a capacitor is not needed in the operation of the inverter-motor system. It should be understood, however, that the invention may be practiced with a conventional LC filter following the bridge 12. Actually, as will be readily appreciated, a variety of different arrangements, other than a phase-controlled rectifier bridge, may be used to produce a controlled or regulated d-c bus voltage for application to d-c bus 26, 27. For example, the bus voltage may be developed by a D-C to D-C converter, such as a chopper, to which is applied a fixed magnitude d-c voltage. By controlling the chopper duty cycle, the fixed d-c voltage can be changed to an adjustable d-c voltage.

SCR inverter 25 is of the three-phase bridge type and has a well-known circuit configuration and a six-step operating cycle. It includes six SCRs 31–36, arranged in three phases or legs, each leg having a pair of SCRs essentially series-connected across the d-c bus 26, 27. The circuit junctions 37, 38 and 39 of the three legs connect to respective ones of the three wye-connected stator windings 41a, 41b and 41c of three-phase synchronous motor 41, the rotor 41d of the motor being rotated by the magnetic field produced by the stator windings. Synchronous motor 41 may be of the wound rotor type or the permanent magnet rotor type or any other type suitable for a motor-commutated drive. Its stator windings may be connected in a delta rather than a wye configuration.

By applying firing or gating signals to the gates of the six inverter SCRs 31–36 in predetermined pairs or sets and in a prescribed sequence, the d-c voltage across the d-c bus 26, 27 is effectively changed to three-phase a-c voltage as applied to the stator windings 41a, 41b and 41c of motor 41, thereby delivering three-phase alternating current to the three windings to produce a rotating magnetic stator field to effect rotation of rotor 41d at a speed determined by and directly proportional to the frequency of the inverter output a-c voltage. For example, if a gating signal is simultaneously supplied to SCRs 31 and 36 to turn those SCRs on, current will flow from line 26 and through, in the order named, the anode-cathode conduction path of SCR 31, junction 37, windings 41a and 41c of motor 41, junction 39 and the anode-cathode conduction path of SCR 36 to line 27 or ground. If the current through SCR 31 is then reduced to zero by some means, effectively commutating the SCR, while at the same time SCR 32 is switched on and SCR 36 is maintained conductive, current will flow from line 26 and through, in the order named, SCR 32, junction 38, windings 41b and 41c, junction 39 and SCR 36 to line 27. In a typical operational sequence, the current through SCR 36 would then be reduced to zero and the SCR would be commutated off. At the same time, SCR 34 would be fired into conduction, SCR 32 remaining on. This would complete a circuit path for motor current to flow in the direction from line 26 and through, in the order named, SCR 32, junction 38, windings 41b and 41a, junction 37 and SCR 34 to line 27. In similar fashion, it will be understood that if SCRs 33 and 34 are then made conductive, SCR 32 being commutated off, current will flow from junction 39 and through windings 41c and 41a to junction 37, and if SCRs 33 and 35 are thereafter maintained on at the same time, SCR 34 being commutated off, current will flow from junction 39 and through windings 41c and 41b to junction 38. Finally, to complete the six-step operating cycle of inverter 25, SCR 33 would then be commutated off while SCRs 31 and 35 would be made conductive to cause current flow from junction 37 and through windings 41a and 41b to junction 38. By properly sequencing the SCRs on and off, the inverter effectively produces three phase-displaced six-step alternating voltages for application to respective ones of the three stator windings 41a, 41b and 41c, the three voltages being phase-displaced from each other by 120°. As is well-known, the application of three-phase a-c voltage to the stator windings of a synchronous motor results in the development of a rotating magnetic field which causes the rotor to rotate in step or in synchronism with the stator field, the rotor speed or frequency thereby equalling the stator field frequency. The magnetic poles of the rotor are attracted by the revolving stator field and follow it in synchronism producing torque by virtue of the magnetic interactions. There is no slip.

The inverter-motor system is constructed and operated to present a leading power factor to inverter 25. The design techniques for achieving this are well understood in the art. Essentially, the back EMF developed in the motor must be made higher or greater than the maximum voltage available from bridge 12. With a leading power factor, the alternating motor current flowing through each stator winding will lead the alternating motor voltage across that winding. In well-known manner, during running operation when the motor is rotating in its normal speed range, and inverter 25 receives a d-c bus voltage along with properly timed and sequenced gating signals for SCRs 31–36, the motor current will lead the motor voltage and the developed back EMF will commutate the appropriate SCRs off at the precise times necessary to maintain proper operation of inverter 25 and rotation of motor 41.

Control circuitry for supplying gating or firing pulses to switch the SCRs 31–36 on and off in the correct sequence and at the correct times, so as to provide the required three-phase a-c current for producing a revolving magnetic stator field to rotate motor 41 in the desired manner, is well-known to those skilled in the art. In the illustrated embodiment the block 43 labeled "inverter controller" includes logic circuitry which, in response to control pulses received over line 45, steers the gating or firing signals to the correct SCRs in the inverter to turn them on in the required sequence. To develop the three phase-displaced, six-step alternating voltages for application to respective ones of the three stator windings, the switching or firing pattern of the inverter SCRs 31–36 must change every 60° of an operating cycle. After every 60° a conducting SCR must be commutated off and a new pair of SCRs must be made conductive. During normal running operation the inhibit line 46 to controller 43 may be ignored and the switching times of the SCRs are determined by the control pulses received over line 45. In the absence of inhibit signals, which are applied to controller 43 over line 46 during start-up to inhibit the firing of the SCRs in a manner to be explained, each time a control pulse is applied over line 45 to the inverter controller a different set of SCRs will become conductive in accordance with the previously described firing sequence, six consecutive control pulses being required to complete each six-step operating cycle for each of the three phase-displaced alternating voltages produced by inverter 25. Hence, during normal running operation the inverter frequency is determined by the pulse repetition frequency of the control pulses on line 45. As will be made apparent, the control pulses are generated in such a way that the inverter frequency is effectively established every 60° of each operating cycle in the inverter. In this way, if it is determined that a frequency change should be made in the inverter, such a change may be made within 60° of an operating cycle. This rapid frequency control over the inverter synchronizes the inverter with the motor, the rotor following the revolving magnetic stator field very closely.

Consideration will now be given to the operation of the inverter-motor system during starting. Mode selector 49 is essentially a timing apparatus for programming or sequencing the starting system through first, second, third and fourth operating modes, the fourth mode being the normal running mode of the inverter-motor arrangement. Control signals on output lines 51a, 51b and 51c of the mode selector 49 control the three analog switches 52, 53 and 54. The positioning of those switches for the various modes is indicated in the drawing by the labels associated with and/or adjacent to the fixed contacts of those analog switches. Output line 55 of selector 49 provides a positivegoing pulse (a "high" signal) when the starting system is established by the selector in the first mode or mode 1, and line 56 outputs a positive-going pulse or "high" signal when the starting system is switched by selector 49 to the second mode (mode 2).

Figure 2:
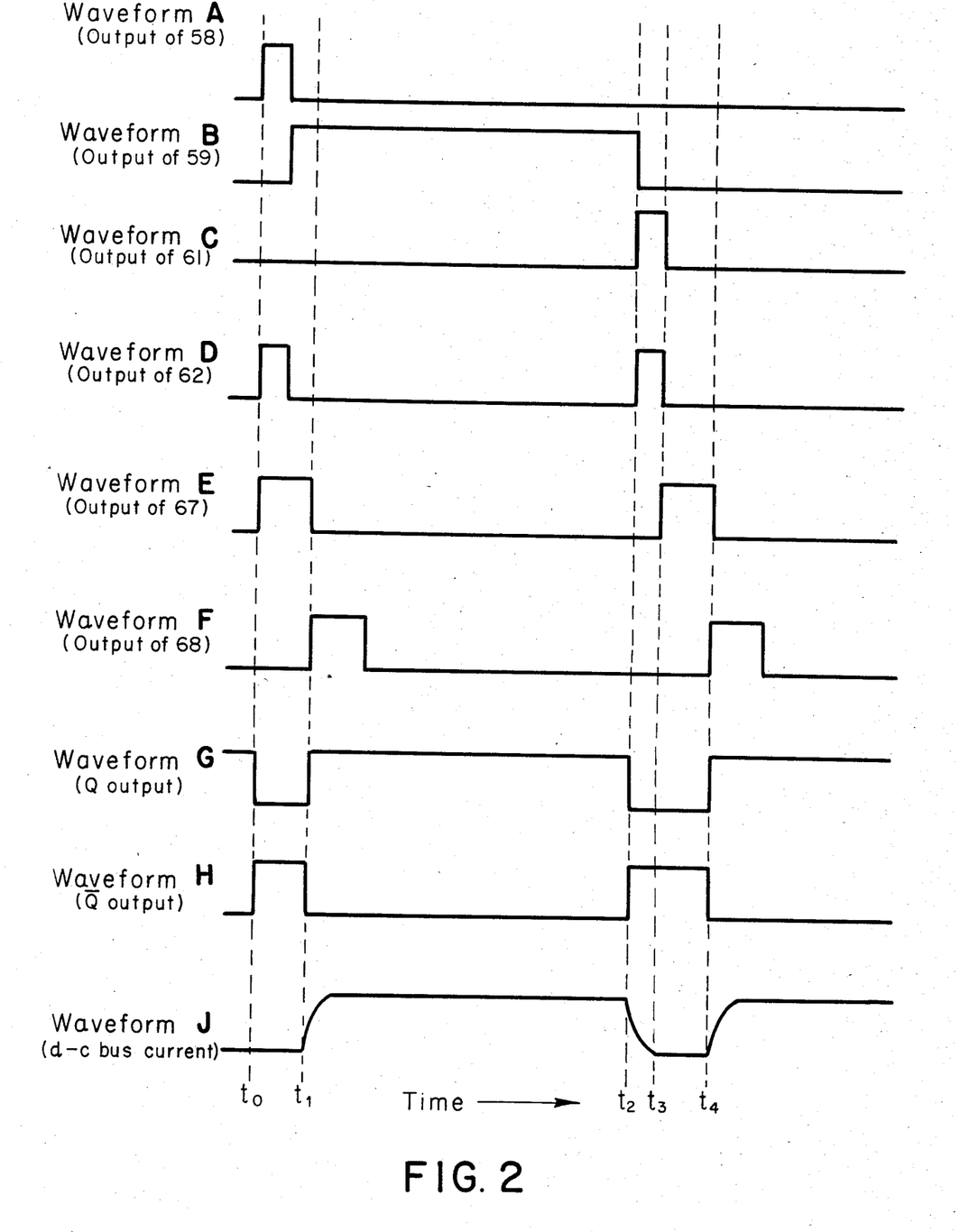
FIG. 2 various voltage and current signal waveforms, present during the initialization mode of the starting procedure, that will be helpful in understanding the initialization portion of the start-up process.

When the entire system is initially turned on or energized, indicated by time $t_0$ in FIG. 2, mode selector 49 will be in its start position and will provide a positive-going pulse on line 55 and, via lines 51a and 51b, will establish analog switches 52 and 53 in their mode 1 positions. Prior to starting, the position of rotor 41d is unknown. The first mode is therefore devoted to initialization of the rotor, namely turning it to a known starting position. This initialization process is commenced at time $t_0$ by the positive-going pulse on line 55 which is applied to one shot 58 to produce the positive-going logic pulse shown by waveform A in FIG. 2. One shot 59 responds to the trailing edge of the output pulse of one shot 58 to produce the positive-going logic pulse of waveform B. In response to the trailing edge of the waveform B pulse, one shot 61 generates the positive-going logic pulse of waveform C, which pulse has the same width as the output pulse of one shot 58. The pulses of waveforms A and C are combined by OR gate 62 to provide the signal of waveform D at the gate's output.

The first-occurring pulse of waveform D (namely the one on the left and starting at time $t_0$) is applied through analog switch 53 and over line 45 to inverter controller 43 which would normally cause the controller to apply gating signals to a pair of inverter SCRs to turn them on. During starting, however, those gating signals will be delayed, by inhibit signals on line 46, in a manner to be explained very shortly. The first-occurring pulse of waveform D is also applied via line 63 and analog switch 52 to the R or reset input of set-reset latch 65 which is of conventional construction, having the following truth table:

| S | R | Q | Q̄ |
|---|---|---|---|
| 0 | 0 | Maintains Previous State | |
| 0 | 1 | 0 | 1 |
| 1 | 0 | 1 | 0 |
| 1 | 1 | 0 | 0 |

As indicated in the above table, when a logic 0 is applied to the set or S input at the same time that a logic 1 is applied to the reset or R input, the Q output will be established at a logic 0 voltage while the voltage at the Q̄ output will be logic 1. Reversing the logic levels at the R and S inputs of latch 65 establishes outputs Q and Q̄ at logic 1 and logic 0, respectively.

Current sensor 66 senses the d-c bus current and applies a signal, proportional to and representing the bus current, to the inverting or (−) input of comparator 67, the non-inverting or (+) input of which is connected to ground or zero volts. When the entire system is initially energized at time $t_0$ there is no current in the d-c bus, as a result of which comparator 67 outputs a logic 1 signal. This is shown in FIG. 2 by the first positive-going pulse in waveform E. The output pulses of comparator 67 are delayed by time delay circuit 68 to provide the pulses of waveform F for application to the S or set input of latch 65. Hence, upon the occurrence of the leading edge of the first pulse of waveform D (namely time $t_0$), which pulse is applied to the R input of latch 65, the S input will be at logic 0. With these logic levels at the inputs, latch 65 switches to its state wherein output Q is established at logic 0 while output Q̄ assumes a logic 1 level. This is reflected by voltage waveforms G and H, found at the Q and Q̄ outputs respectively. The logic 1 signal at the Q̄ output following time $t_0$, namely the first-occurring positive-going pulse in waveform H, is applied over line 46 to the inverter controller 43 to inhibit the application of gate signals to the inverter SCRs. In other words, the gating signals produced by controller 43 will be prevented from reaching the gates of the SCRs. As will be made apparent, the withholding of the gating signals will only be temporary. At the same time that the first Q̄ pulse is applied to controller 43, the logic 0 signal, provided by the first-occurring pulse of waveform G, is applied over line 69 to control the positioning of analog switch 71. This logic 0 level establishes switch 71 in its "phase back" position, a negative voltage from voltage divider 72, 73 thereby being applied over line 74 to the rectifier controller 19. The negative voltage will be at a level to cause controller 19 to set the firing angle at an appropriate value well over 90° to phase the SCRs 13–18 back. The rectified voltage at output terminal 21 of bridge 12 will thus be of negative polarity relative to the zero voltage at the grounded terminal 22. In any event, however, no bus current flows immediately following time $t_0$ since the gating signals to the inverter SCRs are being inhibited or held up. Actually, phasing back of bridge 12 in response to the Q output signal serves no useful function at time $t_0$, since there is zero bus current. Phasing back will be necessary, however, once bus current is supplied through the inverter to the motor. The extent to which SCRs 13–18 are phased back, and consequently the magnitude of the negative rectified voltage across the output terminals 21, 22 of bridge 12, will be appreciated later.

In short, when the inverter-motor system is first turned on at time $t_0$, one shot 58 produces a pulse for application through OR gate 62, switch 53 and line 45 to controller 43 to fire a pair of SCRs in the inverter, but those firing or gating signals are temporarily withheld from the gates of the SCRs by the effect of an inhibit signal (namely the first positive-going pulse of waveform H) from latch 65.

Upon the termination (or the trailing edge) of the first-occurring pulse of waveform D the R input of latch 65 is switched from logic 1 to logic 0. However, at this time the S input will still be at logic 0 (see waveform F) so latch 65 will remain in the state to which it was actuated at time t₀.

After the time delay imposed by delay circuit 68, the leading edge of the positive-going pulse produced by comparator 67 at time t₀ is reproduced at time t₁ at the output of time delay circuit 68, as is evident in waveform F. Thus, the time interval between t₀ and t₁ in FIG. 2 is equal to the time delay introduced by circuit 68. The purpose of the time delay will be explained later. The positive-going amplitude excursion of the F pulse at time t₁ switches the S input of latch 65 from a logic 0 level to a logic 1 level and, since the R input is still at logic 0, this causes the latch to switch states as indicated in waveforms G and H at time t₁, the Q output going to logic 1 and the $\overline{Q}$ output going to logic 0. The logic 1 level of waveform G switches the positioning of analog switch 71 so a positive voltage from voltage divider 75, 76 will be supplied over line 74 to cause controller 19 to set the firing angle at some value substantially less than 90° so the SCRs 13-18 will be phased forward. The SCRs do not necessarily have to be turned fully on to produce maximum rectified voltage at the output of bridge 12. For example, when the bridge is phased forward during the starting process the rectified voltage produced by the bridge may only be a fraction of the maximum level possible. As mentioned, the polarity of the rectified voltage will be positive at terminal 21 with respect to terminal 22.

At the same time t₁ that bridge 12 is phased forward by the Q output (waveform G), waveform H from the $\overline{Q}$ output removes the inhibit signal on line 46 to allow the gating signals to be applied to a pair of inverter SCRs. Assume, for example, that SCRs 31 and 35 are gated on. D-C bus current will thus flow from output terminal 21 of bridge 12 and through the inductance 24 and SCR 31, into stator winding 41a and then out of winding 41b and through SCR 35 to terminal 22. This d-c bus current is shown by waveform J following time t₁. The d-c current through windings 41a and 41b creates a fixed magnetic stator field having a magnetic axis to which rotor 41d rotates and aligns itself. In other words, the rotor will turn until its North and South poles are aligned with the axis of the stator magnetic field. With the exception of two positions of rotor 41d, regardless of the orientation of the rotor and no matter how far the poles of the rotor are from the magnetic axis, the rotor will still rotate around and become aligned with that axis. Assume, for example, that prior to the creation of the magnetic field by the bus current the rotor is 160° away from the axis of that magnetic field. The rotor will still be attracted by the magnetic field and will swing around to the desired aligned position. The two exceptions are: (1) when the rotor is already in the aligned position or (2) when the rotor is 180° away from the aligned position. The first exception is of no concern because the rotor will already be oriented in the position dictated by the stator field. The second exception must be dealt with in order to eliminate any question of ambiguity. This will be handled in a fashion to be explained shortly.

The bus current is made to flow through SCRs 31 and 35 and stator windings 41a and 41b for an interval sufficiently long to allow the rotor 41d to settle down after turning and to come to a complete stop. Of course, the time required to pulse energize the motor and crank it one step and to then permit the motor to come to a complete halt depends on, among other things, the size of the motor. For example, due to inertia a very large motor for driving the compressor of a very large capacity industrial air-conditioning system would need much more time to execute the first step than a smaller motor. The bigger the motor, the longer it will take for the rotor to turn and come to a complete halt.

The duration of the bus current pulse, starting at time t₁, is essentially determined by the construction of one shot 59. In response to the leading edge of the second-occurring pulse of waveform D (namely at time t₂), controller 43 will be actuated to select the next pair of SCRs in the sequence (namely SCRs 31 and 36), and latch 65 will be reset to establish the Q output at logic 0 and the $\overline{Q}$ output at logic 1. The application of gating signals to the new pair of inverter SCRs 31 and 36 will be inhibited but, of course, this will not cut off current flow through the conducting pair of SCRs. By removing the gate current, the previously gated SCRs 31 and 35 will continue to conduct current. Current will tend to continue to flow in the same direction because of the presence of inductor 24 and the motor inductance.

To explain, when the bus current pulse flows through the filter inductance 24 and the motor inductance in the process of cranking the motor one step, reactive energy builds up and becomes stored in those inductances and at the termination of the pulse the reactive energy tends to continue the current flow through the SCRs 31 and 35 and the stator windings 41a and 41b in the same direction. The reactive energy must therefore be absorbed or dissipated to reduce the bus current (and consequently the motor current) to zero to commutate the conducting SCRs off. And this must be done before the next pair of inverter SCRs in the sequence can be turned on.

Reduction of the bus current to zero and forced commutation of the conducting SCRs are achieved by the negative-going pulse of waveform G at time t₂. By establishing line 69 at the logic 0 level, switch 71 is actuated to its "phase back" position, thereby causing bridge 12 to be phased back so that the output voltage across terminals 21 and 22 reverses. The d-c bus current will now flow into the positive terminal 22, effectively regenerating energy from the motor and filter inductances and sending it back into the a-c line. The stored energy is effectively made to flow from the filter and motor inductances to the a-c line voltage, where the power is rapidly absorbed to reduce the motor current to zero. The current decays to zero and extinguishes while the energy is being removed from the inductances. Relatively fast absorption of the reactive energy is necessary to minimize the decay time. The higher the reverse-polarity voltage source absorbing the energy, the faster the energy is dissipated and the faster the current decreases to zero.

To elucidate further, if the reactive energy in an inductance is dissipated in a very low impedance circuit path, a very long time interval would be required for the current to decay to zero. By inserting in series with that circuit path an opposite polarity voltage source, as is the bridge 12 when it is phased back, the time needed to remove the reactive energy and decrease the current to zero is substantially shortened. In fact, the decay time is inversely proportional to the magnitude of the opposite polarity voltage source. The higher the reverse voltage developed across the output terminals 21, 22 when the bridge is phased back, the less time required to absorb the reactive energy and force commutate the conducting SCRs. Thus, the extent to which bridge 12 is phased back is determined by how fast the bus current should be reduced to zero to force commutate the SCRs. As will be appreciated later, the amount of phasing back will be sufficient to force commutate the SCRs fast enough to allow the motor to be cranked up to the speed necessary to develop a satisfactory commutating motor voltage.

At time $t_3$ the d-c bus current (waveform J) has decayed to zero and this will be detected by comparator 67 which compares the bus current with zero. The output voltage (waveform E) of the comparator therefore switches from low (logic 0) to high (logic 1) at time $t_3$ and, after the time delay imposed by delay circuit 68, the positive-going logic pulse will appear at time $t_4$ at the output (waveform F) of the delay circuit. The time delay is made sufficiently long to allow the commutated SCRs in the inverter to regain their forward blocking capability. Latch 65 is thus set at time $t_4$, causing the $\overline{Q}$ output (waveform H) to go low and the Q output (waveform G) to go high. This action removes the inhibit signal from the inverter controller 43, thereby gating on the next pair of SCRs 31 and 36 in the sequence, and phases the bridge 12 forward. A bus current pulse, starting at time $t_4$, will thus be supplied to the stator, the current flowing into winding 41a and out of winding 41c to produce a new stator magnetic field whose magnetic axis is rotated or displaced relative to the magnetic axis of the previous magnetic field created when SCRs 31 and 35 had been conductive. Once again the rotor 41d turns and aligns itself with the new magnetic axis and comes to a complete stop.

The rotor position is now uniquely determined and is initialized. After the rotor has been turned one step by the first bus current pulse, the rotor is brought to a complete stop before the second bus current pulse (starting at time $t_4$) is translated through the next pair of inverter SCRs to execute the second step. The rotor first aligns itself with the magnetic field created in the stator by the first bus current pulse, and then aligns itself with the magnetic field produced by the second bus current pulse. The aligning process was repeated to eliminate any ambiguity in the rotor position. As mentioned previously, if the aligning procedure was carried out only once, the rotor could be in two positions: either aligned with the stator magnetic axis or 180° (electrical) away from it. At the end of the second alignment, the rotor can settle and stop in only one position where it is exactly aligned with the stator magnetic axis.

The first or initialization mode is now completed and the rotor 41d is established and held in a known starting position, namely the position established when SCRs 31 and 36 are gated into conduction. By turning the rotor to a known starting position before mode 2 operation, start-up will proceed much more reliably, consistently, smoothly and rapidly than prior starting systems.

At this time, mode selector 49 issues a control signal over line 51b to move switch 53 to its mode 2 position. In addition, the mode selector outputs a signal on line 56 to initiate the operation of ramp generator 78. Of course, the programming of the mode changes, effected by mode selector 49, will be determined by the size and construction of the motor. When switched to mode 2 operation, the inverter is run asynchronously and the inverter SCRs are sequentially gated on at an increasing frequency to current pulse energize the motor to effect step-by-step rotation of the rotor at a faster and faster rate, the conducting SCRs being forced commutated when the next pair of SCRs in the sequence are to be turned on.

More particularly, when ramp generator 78, in the asynchronous operation circuit, is triggered into operation at time $t_5$ (see FIG. 3) a ramp-shaped voltage, as shown by waveform K, will be produced at the output of the generator. A conventional voltage-to-frequency converter 79 responds to the ramp function to produce a series of pulses (only four of which are shown in waveform L) recurring at a faster and faster rate, thus having a constantly decreasing period between successive pulses. Each pulse produced by converter 79 marks the end of a 60° conduction interval in the inverter operating cycle and effects the firing or gating of the next pair of SCRs in the sequence. Prior to the occurrence of the first pulse (starting at time $t_5$) of waveform L, SCRs 31 and 36 will be conducting as explained. This pulse will be supplied through analog switch 53 and over line 45 to the inverter controller 43 to develop a new set of gating signals to gate on the next pair of SCRs in the sequence, namely SCRs 32 and 36. However, the new gating signals will be prevented from reaching the gates of SCRs 32 and 36 because the same pulse from converter 79 will also be supplied over line 63 and through switch 52 to reset the latch 65. The $\overline{Q}$ output (waveform N) of the latch thus becomes high (logic 1) at time $t_5$ and inhibits the application of gating signals to inverter controller 43. At the same time $t_5$ the Q output (waveform M) becomes low (logic 0), as a result of which the bridge 12 is phased back. This causes the d-c bus current to decay to zero, as indicated by waveform P, to force commutate the conducting SCRs 31 and 36. When the bus current decreases to zero (time $t_6$), comparator 67 outputs a high signal (see waveform R) and, after the time delay introduced by circuit 68 to allow the inverter SCRs to recover their blocking capability, this positive-going pulse is reproduced at time $t_7$ at the output of delay circuit 68 (see waveform S) for application to the set input of latch 65. The latch thereupon switches operating states, removing the inhibit signal to effect gating of the next pair of SCRs 32 and 36 and causing bridge 12 to be phased forward to deliver a current pulse through the gated SCRs, the motor current flowing into winding 41b and out of winding 41c to turn the rotor 41d to the next step.

Figure 3:
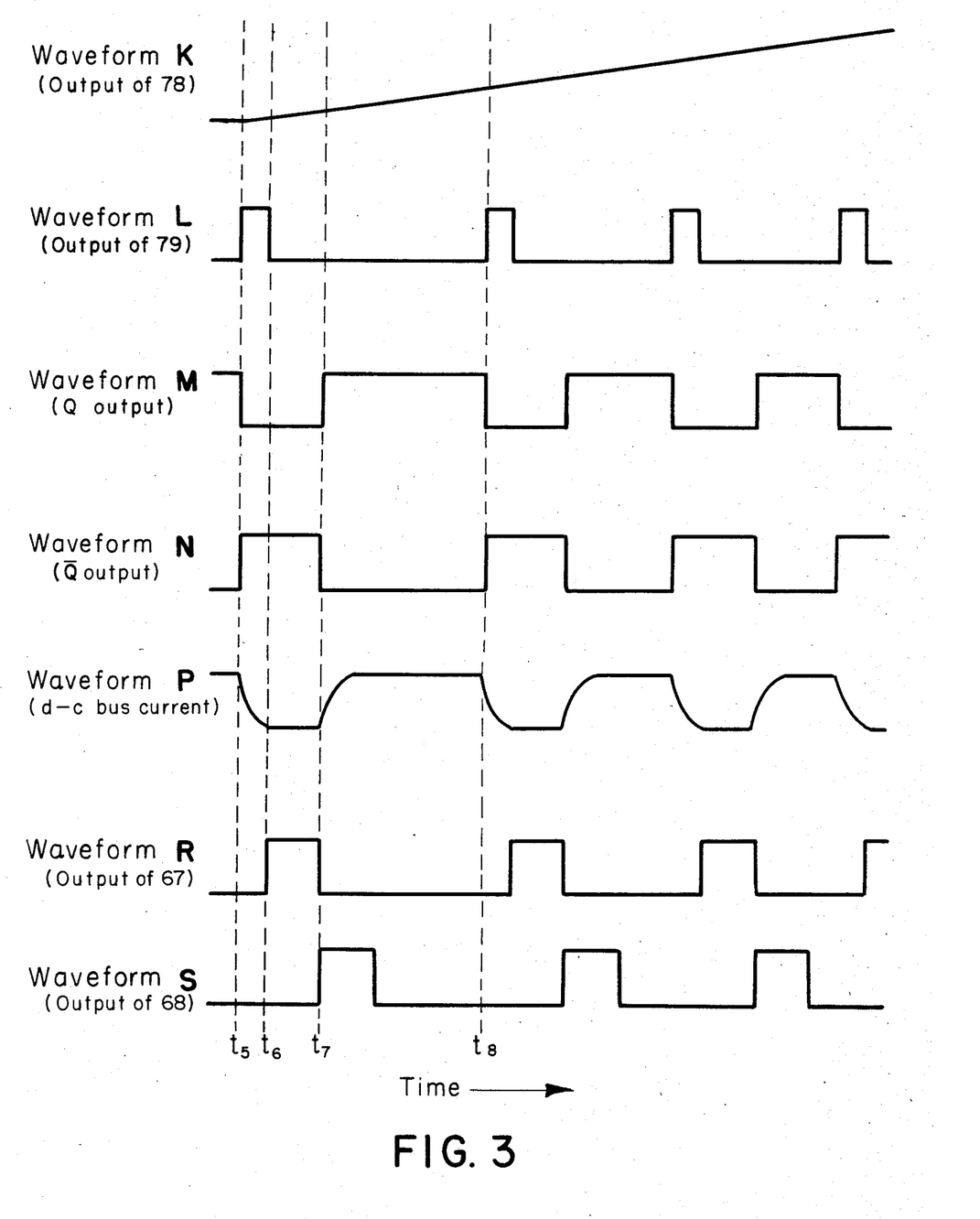
FIG. 3 shows various voltage and current signal waveforms that are present during the next mode or step of the starting procedure and will be helpful in explaining the operation during that mode.

In response to the next pulse (starting at time $t_8$) of waveform L, produced by converter 79, the process is repeated. Latch 65 is reset to inhibit gating of the inverter SCRs and to phase back the bridge 12. After the bus current is reduced to zero to force commutate the conducting SCRs 32 and 36 and then after the SCRs have regained their blocking ability, latch 65 is set to gate on the next pair of SCRs 32 and 34 in the sequence and to phase the bridge 12 forward to supply a bus current pulse through those SCRs to the motor to turn the rotor another step. This process, of course, continues, the pulses developed by converter 79 (which recur at an increasing frequency) causing sequential gating of the pairs of inverter SCRs and translation of current pulses through the gated SCRs to the stator to current pulse energize the motor to effect step-by-step rotation of the rotor at a faster and faster rate, the motor current being reduced to zero at the termination of each energizing pulse to force commutate the conducting pair of SCRs. It is to be noted that the inverter has to be run asynchronously in mode 2 because at low speeds the motor voltage is too low to provide synchronizing information.

It will now be appreciated that the phasing back of bridge 12 must be sufficient so that between the bus current pulses, which recur at a faster and faster rate during starting, the energy stored in inductor 24 and in the motor inductance must be rapidly dissipated.

After the starting system has been operated in the second mode and the motor has reached a preset speed, valid information will be available from the motor voltage to permit synchronization of the inverter operation with the motor. However, there may be a substantial change in the inverter firing angle in going from asynchronous operation (mode 2) to motor-commutated operation, namely the normal running mode. If the change were made in one step there is a high probability of a commutation failure. Hence, and in accordance with a salient feature of the invention, an operating mode (mode 3) is provided wherein inverter 25 is run synchronously but with forced commutation. Mode 3 provides a transition period or buffer between asynchronous operation and motor-commutated operation. The change in inverter firing angle can be tolerated because forced commutation is still being used and hence a commutation failure is avoided. In this way, the motor starts reliably and consistently.

When the preset motor speed is attained, and the starting system is ready for mode 3 operation, mode selector 49 issues a control signal on line 51b and changes the positioning of analog switch 53 to the mode 3 position (which is also the mode 4 position). Mode selector 49 also applies a control signal to line 51c to establish analog switch 54 in its mode 3 position. Inverter controller 43 and latch 65 will now be operated by synchronizing pulses, developed by the synchronizing circuit, rather than by pulses from the asynchronous operation circuit as in mode 2. The current commutation control circuit, switches 52 and 71, and inverter controller 43 will thus all operate in the same manner as discussed previously in connection with mode 2, the only difference being that the pulses applied to lines 45 and 63 will now come from the synchronizing circuit. As will be appreciated, as mode 3 operation proceeds the motor speed continues to increase and the synchronizing puses will occur at a faster and faster rate.

To produce the synchronizing pulses, rectifier 81 senses and rectifies the motor terminal voltage and the rectified voltage is integrated in integrator 82, the integrated voltage (which will be a positive-going ramp starting at zero volts) being applied to the non-inverting or (+) input of comparator 83, functioning as a level detector. The inverting or (−) input of comparator 83 is connected through switch 54 to voltage divider 84, 85 to provide a reference voltage, representing a preset threshold level, for the comparator. When the output voltage of integrator 82 integrates up to the reference voltage, comparator 83 produces a synchronizing pulse for application to line 86, the pulse also being fed back to effect reset of integrator 82 to zero in order to start a new integration cycle. In other words, when level detector 83 determines that the ramp-shaped integrated voltage has reached the preset threshold level, a synchronizing pulse is developed for application over line 86 and through switch 53 to inverter controller 43 and latch 65 to initiate the reduction of the bus current to zero to force commutate the conducting pair of SCRs and mark the end of a 60° conduction interval in the inverter, and to then fire a new set of SCRs into conduction to start another 60° conduction interval.

In this way, a train or series of synchronizing pulses is provided on line 86 which is used to generate gating signals for the inverter SCRs, the time between two successive synchronizing pulses corresponding to the 60° conduction period for a given pair of SCRs.

A constant volt-time integral (namely, a constant ratio of inverter output voltage relative to inverter frequency or volts/hertz) is thus obtained between successive synchronizing pulses on line 86, and consequently between successive inverter firings, the value of this volt-time integral, or volts/hertz ratio, being set by the reference voltage applied to comparator 83 and derived from voltage divider 84, 85, the reference level being selected for optimum performance during mode 3 operation. In effect, the frequency of the inverter is adjusted six times, or every 60°, during each inverter cycle. Every 60° of the inverter cycle a determination is made as to what the inverter frequency should be in order to obtain a constant volts/hertz ratio.

It will thus be realized that the frequency of inverter 25 is directly proportional to the magnitude of the motor voltage. When the motor voltage is relatively low, it takes a relatively long time for the integrator output voltage to reach the threshold level represented by the reference voltage, causing the synchronizing pulses to have a relatively long time separation and the inverter to have a relatively low frequency. As the motor voltage increases, the time required for the integrated voltage to reach the threshold level will be reduced, resulting in an increased inverter frequency.

If the motor speed increases (which is what occurs as the starting process proceeds during mode 3) the motor's back EMF will increase because the field is rotating faster. The integrated voltage produced by integrator 82 will thus rise at a greater rate, producing synchronizing pulses recurring at a higher frequency, as a consequence of which the inverter SCRs are sequenced into conduction at a faster and faster rate and the inverter frequency increases. With the synchronizing circuit and with forced commutation, the inverter will be synchronized with the motor when the starting system is in mode 3. In effect, the synchronizing pulses synchronize the gating of the inverter SCRs to the rotor position so that the rotor will follow the revolving stator magnetic field very closely and never pull out of synchronism.

By controlling and timing the firing of each new pair of SCRs in response to the sensed motor voltage at that time, the rotating stator magnetic field is effectively controlled on a transient basis so that it will always be sufficiently close to the rotating rotor to synchronize the rotor to the stator magnetic field. Viewed differently, the rotating stator magnetic field is so controlled that the rotating rotor 41d will never lag behind the stator field far enough to fall out of synchronism. In this way, the stator magnetic field is prevented from getting too far ahead of the rotor. The stator field is effectively dynamically adjusted so that it will lead or track ahead of the revolving rotor by a relatively constant angle. Thus, for example, when the rotor 41d speeds up, the increasing motor voltage causes an increase in the frequency of the synchronizing pulses to increase the inverter frequency, thereby increasing the speed of the rotating stator magnetic field to maintain synchronism with the rotor. On the other hand, if the rotor tends to slow down, the motor voltage drops and the inverter frequency is reduced, as a consequence of which the rotating stator magnetic field tends to slow down so the rotor will not fall out of synchronism. It is thus apparent that the synchronizing circuit responds to any variation of the motor terminal voltage and provides control over the inverter to rapidly change the inverter frequency in order that it will vary in step with and in the same direction as a change in the magnitude of the motor voltage, thereby holding a relatively constant angle between the revolving stator magnetic field and the revolving rotor. In maintaining this tight control over the inverter frequency, the ratio of the inverter output voltage relative to the inverter frequency will be maintained constant at all times.

The importance of forced commutating the inverter SCRs in mode 3 will now be appreciated. Unless the position of the rotor is exactly right, meaning that the correct angle exists between the rotor and the stator field, motor commutation will not occur. By employing forced commutation as in the present invention, a substantial leeway for error will be tolerated. Even though a relatively large angle may exist between the rotating rotor and the rotating stator magnetic field, the synchronizing circuit will keep the rotor from pulling out of synchronism. As mode 3 proceeds and the motor is driven faster and faster, forced commutation assisted by motor commutation will occur at the same time to pull the rotor in perfect synchronism with the rotating stator field, the rotor thereby following the stator field very closely.

When motor 41 has attained a given speed (usually about 10% of full speed) at which the stator field and rotor are precisely in synchronism and the back EMF is of sufficient magnitude to commutate the inverter SCRs without the help of any forced commutation, the starting system will be switched to mode 4, the normal running mode. This mode change is made by mode selector 49 which issues control signals over lines 51a and 51c to actuate switches 52 and 54 to their mode 4 positions. Switch 53 will not be changed since the mode 3 and mode 4 positions are the same. Phasing of the bridge 12 back and forth to produce bus current pulses and to effect commutation is no longer required so the R input of latch 65 is disconnected from the pulses going to the inverter controller 43. This is accomplished by switch 52 which connects the R input to zero volts, thereby ensuring that the Q output of the latch remains high to maintain the bridge 12 phased forward all the time. The $\bar{Q}$ output will remain low at this time so no inhibit signal will be applied to the inverter controller.

In the fourth mode the gating of the inverter SCRs continues to be synchronized with the motor, through the synchronizing circuit, and controlled by the motor voltage, but the SCRs will now be commutated only by the motor voltage. A different voltage divider 88, 89 is connected through switch 54 to comparator 83 when the system is in mode 4 in order to provide different volts/hertz ratios for modes 3 and 4. Since mode 3 employs forced commutation, a smaller effective voltage will be obtained than in mode 4 for the same frequency.

For normal motor commutation operation with the motor running in its normal speed range, bridge 12 will be phased forward at a firing angle determined by the load requirements, such as by the specific motor speed desired. Although not shown in FIG. 1, resistor 76 may be adjustable to facilitate the application of a controlled voltage to the rectifier controller 19 to vary the firing angles of the SCRs 13-18 as needed to establish the motor speed at a desired level.

It will now be apparent that the starting scheme of the invention accomplishes motor starting in a simple and reliable manner. The importance of mode three, in particular, must be fully understood. As the motor is run asynchronously in mode 2 and the inverter SCRs are fired at a faster and faster rate, the revolving rotor may lag farther and farther behind the revolving stator magnetic field, the angle therebetween becoming larger and larger. To achieve motor commutation, however, that angle must be relatively narrow. If the angle between the rotating rotor and the rotating stator field is too wide, it may be impossible to operate in synchronism if the system were switched directly from asynchronous, forced-commutation operation (mode 2) to synchronous, motor-commutation operation (mode 4). For final motor commutation, unless the angle is relatively narrow the inverter-motor system will not pull into exact synchronism. If the switch exclusively to motor commutation is made when the angle is too large, the system will drop out of synchronism. By employing both forced commutation and motor commutation in mode 3, the rotor will be pulled into perfect synchronism with a narrow angle between the stator field and the rotor. It will now be possible to successfully motor commutate without the need for any forced commutation. Hence, the third mode essentially provides a buffer that allows the rotor to be brought into a final position, relative to the revolving stator field, so that the desired motor commutation will instantly occur when the system is switched exclusively to motor commutation, namely mode 4. In addition, without mode 3 operation the motor could suddenly go from a very large stator field-rotor angle to a narrow angle, producing large transients. Operation in mode 3 thus ensures a very smooth, reliable, consistent and relatively short transition from asynchronous, forced-commutation operation to synchronous, motor-commutated operation.

SUMMARY

To summarize, the invention provides a starting method and a starting system for an inverter-motor system wherein a synchronous motor, having a stator and a rotor, is normally driven by the output a-c voltage produced by a motor-commutated SCR inverter, whose SCRs are gated into conduction in predetermined pairs and in a prescribed sequence to conduct current to the stator. Initially the starting system is operated in a first mode wherein two pairs of SCRs are gated on in the prescribed sequence, and current pulses are supplied to the stator through the gated SCRs, to rotate the rotor to a first position and then to a second position, the rotor coming to a complete stop in each of those positions. Thereafter, the starting system is operated in a second mode wherein the pairs of SCRs are sequentially gated into conduction at an increasing frequency to current pulse energize the motor to effect step-by-step rotation of the rotor at a faster and faster rate, the motor current being reduced to zero at the termination of each energizing pulse to force commutate the conducting pair of SCRs. The starting system is subsequently operated in a third mode, after the motor has reached a preset speed, wherein the inverter is synchronized with the motor and is operated at a faster and faster rate, the gating of the SCRs being controlled by the motor voltage and synchronized to the rotor position, while at the same time the SCRs are forced commutated. After the motor has reached a given speed which is higher than the preset speed, the starting system is operated in a fourth and normal running mode wherein the gating of the SCRs is synchronized to the motor voltage and the SCRs are commutated only by the motor voltage.

While a particular embodiment of the of the invention has been shown and described, modifications may be made, and it is intended in the appended claims to cover all such modifications as may fall within the true spirit and scope of the invention.

We claim:

1. A starting system for an interter-motor system wherein a synchronous motor, having a stator and a rotor, is normally driven by the output a-c voltage developed by an inverter, which has a series of motor-commutated SCRs that are gated into conduction in predetermined pairs and in a prescribed sequence to conduct current to the motor, from an applied d-c bus voltage, and in response to received bus current, translated to the inverter over a d-c bus and a series-connected filter inductance from a controlled rectifier bridge to which is applied a-c line voltage, said starting system comprising:

means for sequentially gating the pairs of inverter SCRs at an increasing frequency to current pulse energize the motor to effect step-by-step rotation thereof at a faster and faster rate, the motor current being reduced to zero at the termination of each energizing pulse by controlling the rectifier bridge to force commutate the conducting pair of SCRs, the bus current being decreased to zero, to force commutate the conducting SCRs, by controlling the rectifier bridge so that it will rapidly dissipate the energy that builds up and becomes stored in the filter and motor inductances when the bus current flows therethrough, thereby minimizing the decay time of the bus current to zero to facilitate faster gating on of the next pair of SCRs in the sequence;

a synchronizing circuit, operative after the motor has reached a preset speed, for sensing only the motor voltage and for developing synchronizing pulses in response to that sensed motor voltage, said synchronizing circuit including a rectifier for rectifying the motor voltage, an integrator for integrating the rectified motor voltage, a comparator for comparing the integrated voltage with a reference voltage representing a preset threshold level, a synchronizing pulse being produced each time the integrated voltage integrates up to the reference voltage and reaches the threshold level, and a reset circuit for feeding each synchronizing pulse back to the integrator to effect reset thereof to zero in order to start a new integration cycle, a constant volt-time integral thereby being obtained between successive synchronizing pulses as determined by the value of the reference voltage;

and means for utilizing each synchronizing pulse to control the rectifier bridge to reduce the bus current to zero to force commutate the conducting pair of inverter SCRs and to then gate on the next pair of SCRs in the prescribed sequence and supply current to the motor through that next pair of SCRs, thereby effectively synchronizing the gating of the inverter SCRs to the rotor position while at the same time force commutating the SCRs, a constant ratio of the inverter output voltage relative to the inverter frequency being obtained as a result of the constant volt-time integral.

* * * * *